(12) United States Patent
Skovby et al.

(10) Patent No.: US 10,046,992 B2
(45) Date of Patent: Aug. 14, 2018

(54) MICRONIZED $CACO_3$ SLURRY INJECTION SYSTEM FOR THE REMINERALIZATION OF DESALINATED AND FRESH WATER

(75) Inventors: Michael Skovby, Meilen (CH); Martine Poffet, Uettligen (CH); Matthias Buri, Rothrist (CH); René Vinzenz Blum, St. Urban (CH)

(73) Assignee: Omya International AG, Oftringen (CH)

( * ) Notice: Subject to any disclaimer, the term of this patent is extended or adjusted under 35 U.S.C. 154(b) by 238 days.

(21) Appl. No.: 13/812,256

(22) PCT Filed: Aug. 10, 2011

(86) PCT No.: PCT/EP2011/063773
§ 371 (c)(1),
(2), (4) Date: Feb. 28, 2013

(87) PCT Pub. No.: WO2012/020056
PCT Pub. Date: Feb. 16, 2012

(65) Prior Publication Data
US 2013/0164411 A1    Jun. 27, 2013

Related U.S. Application Data

(60) Provisional application No. 61/401,854, filed on Aug. 20, 2010.

(30) Foreign Application Priority Data

Aug. 13, 2010  (EP) ..................................... 10172771

(51) Int. Cl.
*A23L 2/54*    (2006.01)
*C02F 1/68*    (2006.01)

(52) U.S. Cl.
CPC .......... *C02F 1/68* (2013.01); *C02F 2209/003* (2013.01); *C02F 2303/24* (2013.01)

(58) Field of Classification Search
CPC .................................. C02F 1/68; C02F 5/083
(Continued)

(56) References Cited

U.S. PATENT DOCUMENTS 4,678,661 A * 7/1987 Gergely .................... A23L 2/40
                                                          424/44
5,008,020 A    4/1991 Surash et al.
(Continued)

FOREIGN PATENT DOCUMENTS

DE        19616647 A1    10/1997
EP         0187432 A1     7/1986
(Continued)

OTHER PUBLICATIONS

The International Search Report, dated Jan. 30, 2012 for PCT Application No. PCT/EP2011/063773.
(Continued)

*Primary Examiner* — Helen F Heggestad
(74) *Attorney, Agent, or Firm* — Amster, Rothstein & Ebenstein LLP (57) ABSTRACT

The present invention concerns a process for treating water and the use of calcium carbonate in such a process. In particular, the present invention is directed to a process for remineralization of water comprising the steps of providing feed water, and injecting gaseous carbon dioxide and a slurry into the feed water, wherein the slurry comprises micronized calcium carbonate.

36 Claims, 1 Drawing Sheet

(58) Field of Classification Search
USPC .............................................. 426/66, 74, 477
See application file for complete search history.

(56) References Cited

U.S. PATENT DOCUMENTS

| | | | |
|---|---|---|---|
| 5,525,224 | A | 6/1996 | Funahashi et al. |
| 5,811,070 | A | 9/1998 | You |
| 5,914,046 | A | 6/1999 | Watten |
| 5,993,737 | A * | 11/1999 | Mackintosh et al. ........... 422/14 |
| 6,419,836 | B1 | 7/2002 | Willuweit |
| 7,374,694 | B2 * | 5/2008 | Gaudinot et al. ............. 210/752 |
| 7,771,599 | B1 | 8/2010 | Choi et al. |
| 2004/0058034 | A1 * | 3/2004 | Mehansho .............. A23L 1/302 426/74 |

FOREIGN PATENT DOCUMENTS

| | | |
|---|---|---|
| EP | 0520826 A1 | 12/1992 |
| EP | 1974806 A1 | 10/2008 |
| EP | 1974807 A1 | 10/2008 |
| EP | 1975310 A1 | 10/2008 |
| EP | 1982759 A1 | 10/2008 |
| JP | S6178493 A | 4/1986 |
| JP | S63059393 A | 3/1988 |
| JP | H05293476 A | 11/1993 |
| JP | H06154770 A | 6/1994 |
| KR | 100441169 B1 | 7/2004 |
| RU | 2247079 C2 | 2/2005 |
| SU | 1412232 A1 | 9/1990 |
| WO | 2010/012691 * | 2/2010 |
| WO | 2010012691 A1 | 2/2010 |

OTHER PUBLICATIONS

The Written Opinion of the International Searching Authority, dated Jan. 30, 2012 for PCT Application No. PCT/EP2011/063773.
Chan et al., "Limestone Dissolution—Effects of pH, CO2, and Buffers Modeled by Mass Transfer," In Flue Gas Desulfurization, Hudson J. et al., ACS Symposium Series, American Chemical Society, Washington, D.C., 1982, pp. 75-97.
Dedek et al., "Le Carbonate de Chaux," Lovain, 1966.
DVGW, "Lehr- und Handbuch Wasserversorgung, vol. 6, Wasseraufbereitung-Grundlagen und Verfahren," Oldenburg Industrieverlag, Munich, Germany, 2004, pp. 671-708.
Falbe et al., "Roempp-Lexikon Chemie," keyword "Kalke," Stuttgart, New York, 10th Edition, vol. 3, H-L, 1997, pp. 2066-2068.
Hasson et al., "Modeling Remineralization of Desalinated Water by Limestone Dissolution," Desalination, vol. 190, 2006, pp. 189-200.
Jalil, "Limestone Contactors as a Corrosion Control Technology for Small Public Water Systems: An Educational Module for Drinking Water Professionals," Master's Theses, University of Tennessee, Dec. 2003.
Jander et al., "Lehrbuch der Analytischen und Praeparativen Anorganischen Chemie," 13th Edition, Stuttgart, Hirzel, 1989, pp. 24-35.

Lueckert, "Pigment + Fuellstoff, Tabellen," 6th Edition, 2002, pp. 760-762.
Rickard et al., "Mixed Kinetic Control of Calcite Dissolution Rates," American Journal of Science, vol. 283, Oct. 1983, pp. 815-830.
RWW, "Trinkwasserdurchschnittsanalyse—Wasserwerk: Essen-Kettwig," Analysis of Drinking Water, Nov. 30, 2013.
Striebel et al., "Kinetic Aspects of Different Procedures for the Adjustment of the pH-Value; Steps Against Acidification and for Buffering of Drinking Water and Dam Water Bodies," Conference—Innovations in Conventional and Advanced Water Treatment Processes, Amsterdam, The Netherlands, Sep. 25-29, 2000, pp. 74-1 to 74-6.
Vincentz Network, "Mischen staff Blechen," Farbe & Lack, Dec. 2004, p. 22.
"Water Treatment Handbook," 7th Edition, vol. 1, 2007, pp. 390-393.
Willuweit et al., "Erfolgreiche Gewaessersanierung durch pH-Wert-Einstellung mit einem neuen Verfahren (A New Method for Successful Water Treatement)," Vom Wasser, vol. 85, 1995, pp. 241-250.
Withers, "Options for Recarbonation, Remineralisation and Disinfection for Desalination Plants," Desalination, vol. 179, 2005, pp. 11-24.
Office Action dated Aug. 7, 2013 for Australian Patent Application No. 2011288455.
Office Action dated Feb. 11, 2013 for Chilean Patent Application No. 415-13.
Office Action dated Feb. 18, 2013 for Colombian Patent Application No. 13-26648-5.
European Search Report dated Nov. 10, 2010 for European Patent Application No. 10172771.7.
Grounds for Opposition dated Sep. 9, 2015 for European Patent Application No. 10172771.7.
Office Action dated Dec. 17, 2014 for Gulf Cooperation Council Patent Application No. GC 2011-19037.
Office Action dated Jul. 12, 2017 for Indian Patent Application No. 275/MUMNP/2013.
Office Action dated Jan. 11, 2016 for Israeli Patent Application No. 224462.
Office Action dated Jul. 22, 2014 for Japanese Patent Application No. 2013-524412.
Office Action dated Aug. 29, 2014 for Korean Patent Application No. 10-2013-7006124.
Office Action dated May 4, 2017 for Mexican Patent Application No. MX/A/2013/001597.
Grant Decision dated Sep. 27, 2015 for Russian Patent Application No. 2013110842/05(016017).
Office Action dated May 19, 2014 for Russian Patent Application No. 2013110842/05(016017).
Office Action dated Jan. 12, 2015 for Singapore Patent Application No. 2013010509.
Office Action dated Jul. 5, 2013 for Taiwanese Patent Application No. 100126567.

* cited by examiner

MICRONIZED CACO₃ SLURRY INJECTION SYSTEM FOR THE REMINERALIZATION OF DESALINATED AND FRESH WATER

CROSS-REFERENCE TO RELATED APPLICATIONS

This application is a U.S. national phase of PCT Application No. PCT/EP2011/063773, filed Aug. 10, 2011, which claims priority to European Application No. 10172771.7, filed Aug. 13, 2010 and U.S. Provisional Application No. 61/401,854, filed Aug. 20, 2010.

The invention relates to the field of water treatment, and more specifically to a process for remineralization of water and the use of calcium carbonate in such a process.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of seawater, brine, brackish waters, waste waters and contaminated effluent waters is gaining more and more importance for environmental and economic reasons.

In order to recover water from seawater or brackish water, for potable usages, several processes are known, which are of considerable importance for dry areas, coastal regions and sea islands, and such processes comprise distillation, electrolytic as well as osmotic or reverse osmotic processes. The water obtained by such processes is very soft and has a low pH value because of the lack of pH-buffering salts, and thus, tends to be highly reactive and unless treated, it can create severe corrosion difficulties during its transport in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to remineralize the water.

Conventional processes that are mainly used for the remineralization of water are lime dissolution by carbon dioxide and limestone bed filtration. Other, less common remineralization processes, comprise, e.g., the addition of hydrated lime and sodium carbonate, the addition of calcium sulfate and sodium bicarbonate, or the addition of calcium chloride and sodium bicarbonate.

The lime process involves treatment of lime solution with $CO_2$ acidified water, wherein the following reaction is involved:

As can be gathered from the above reaction scheme, two equivalents of $CO_2$ are necessary to convert one equivalent of $Ca(OH)_2$ into $Ca^{2+}$ and bicarbonate for remineralization. This method is dependent on the addition of two equivalents of $CO_2$, in order to convert the basic anion hydroxide into the buffering bicarbonate species. For the remineralization of water, a saturated calcium hydroxide solution, commonly named lime water, of 0.1-0.2 wt.-% based on the total weight, is prepared from a lime milk (usually at most 5 wt.-%). Therefore a saturator to produce the lime water must thereof be used and large volumes of lime water are necessary to achieved the target level of remineralization. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing the soft water through a bed of granular limestone dissolving the calcium carbonate in the water flow. Contacting limestone with $CO_2$ acidified water mineralizes the water according to:

Unlike the lime process, only one equivalent of $CO_2$ is stoichiometrically necessary to convert one equivalent of $CaCO_3$ into $Ca^{2+}$ and bicarbonate for remineralization. Moreover, limestone is not corrosive and due to the buffering properties of $CaCO_3$ major pH shifts are prevented.

One additional advantage of using calcium carbonate instead of lime is its very low carbon dioxide footprint. In order to produce one ton of calcium carbonate 75 kg of $CO_2$ is emitted, whereas 750 kg of $CO_2$ is emitted for the production of one ton of lime. Therefore the use of calcium carbonate instead of lime presents some environmental benefits.

However, the dissolution rate of granular calcium carbonate is slow and large filters are needed for the limestone filtration process. That causes a sizeable footprint of these filters, and large plant surfaces are required for such limestone bed filtration systems.

Methods for remineralization of water using lime milk or a slurry of lime are described in U.S. Pat. No. 7,374,694 and EP 0 520826. U.S. Pat. No. 5,914,046 describes a method for reducing the acidity in effluent discharges using a pulsed limestone bed.

Thus, considering the drawbacks of the known processes for remineralization of water, it is an object of the present invention to provide an alternative or improved process for remineralization of water.

Another object of the present invention is to provide a process for remineralization of water that does not require a corrosive compound, and thus, avoids the danger of incrustation, eliminates the need for corrosion resistant equipment, and provides a safe environment for people working in the plant. It would also be desirable to provide a process that is environmental friendly and requires low amounts of carbon dioxide when compared to today's water remineralization with lime processes.

Another object of the present invention is to provide a process for remineralization of water, wherein the amount of minerals can be adjusted to the required values.

Another object of the present invention is to provide a process for remineralization using limestone that allows the use of smaller remineralization units, or to provide a remineralization process that allows the use of smaller volumes of the remineralization compound, for instance, in comparison with the lime process. It would also be desirable to provide a process that can be operated on smaller plant surfaces than the limestone bed filtration process.

The foregoing and other objects are solved by the provision of a process for remineralization of water comprising the steps of (a) providing feed water, and (b) injecting gaseous carbon dioxide and a slurry into the feed water, wherein the slurry comprises micronized calcium carbonate.

According to another aspect of the present invention, a use of a micronized calcium carbonate for remineralization of water is provided.

Advantageous embodiments of the present invention are defined in the corresponding sub-claims.

According to one embodiment the concentration of calcium carbonate in the slurry is from 0.05 to 40 wt.-%, from 1 to 25 wt.-%, from 2 to 20 wt.-%, preferably from 3 to 15 wt.-%, and most preferably from 5 to 10 wt.-% based on the total weight of the slurry, or the concentration of calcium carbonate in the slurry is from 10 to 40 wt.-%, from 15 to 30 wt.-%, or from 20 to 25 wt.-% based on the total weight of the slurry. According to another embodiment the calcium carbonate has a particle size from 0.1 to 100 µm, from 0.5 to 50 µm, from 1 to 15 µm, preferably from 2 to 10 µm, most preferably 3 to 5 µm. According to still another embodiment the calcium carbonate has a HCl insoluble content from 0.02 to 2.5 wt.-%, 0.05 to 1.5 wt.-%, or 0.1 to 0.6 wt.-% based on the total weight of the micronized calcium carbonate. According to still another embodiment the calcium carbonate is a ground calcium carbonate, modified calcium carbonate, or precipitated calcium carbonate, or mixtures thereof.

It is noted that calcium carbonate is the main constituent of marble, limestone and chalk. Calcite is a carbonate mineral and the most stable polymorph of calcium carbonate. The other polymorphs of calcium carbonate are the minerals aragonite and vaterite. Aragonite will change to calcite at 380-470° C., and vaterite is even less stable. According to one embodiment the slurry comprises further minerals containing magnesium, potassium or sodium, preferably magnesium carbonate, calcium magnesium carbonate, e.g. dolomitic limestone, calcareous dolomite, dolomite or half-burnt dolomite; magnesium oxide such as burnt dolomite, magnesium sulfate, potassium hydrogen carbonate, or sodium hydrogen carbonate. According to another embodiment the slurry is freshly prepared by mixing water and the calcium carbonate. According to still another embodiment the time period between the preparation of the slurry and the injection of the slurry is less than 48 hours, less than 24 hours, less than 12 hours, less than 5 hours, less than 2 hours or less than 1 hour. According to still another embodiment the injected slurry meets microbiological quality requirements specified by the national guidelines for drinking water.

According to one embodiment the obtained remineralized water has a calcium concentration as calcium carbonate from 15 to 200 mg/l, preferably from 50 to 150 mg/l, and most preferred from 100 to 125 mg/l, or from 15 to 100 mg/l, preferably from 20 to 80 mg/l, and most preferably from 40 to 60 mg/l. According to another embodiment the obtained remineralized water has a magnesium concentration from 5 to 25 mg/l, preferably from 5 to 15 mg/l, and most preferred from 8 to 12 mg/l. According to still another embodiment the remineralized water has a turbidity value of lower than 5.0 NTU, lower than 1.0 NTU, lower than 0.5 NTU, or lower than 0.3 NTU. According to still another embodiment the remineralized water has a Langelier Saturation Index from −1 to 2, preferably from −0.5 to 0.5, most preferred from −0.2 to 0.2. According to still another embodiment the remineralized water has a Slit Density Index $SDI_{15}$ below 5, preferably below 4, and most preferred below 3. According to still another embodiment the remineralized water has a Membrane Fouling Index $MFI_{0.45}$ below 4, preferably below 2.5, most preferred below 2.

According to one embodiment the feed water is desalinated seawater, brackish water or brine, treated wastewater or natural water such as ground water, surface water or rainfall.

According to one embodiment the carbon dioxide is injected in a first step, and the slurry is injected subsequently in a second step, or the slurry is injected in a first step and the carbon dioxide is injected subsequently in a second step, or the carbon dioxide and the slurry are injected simultaneously. According to another embodiment carbon dioxide is injected in the water used for the slurry preparation.

According to one embodiment the remineralized water is blended with feed water. According to another embodiment the process further comprises a particle removal step.

According to one embodiment the process further comprises the steps of (c) measuring a parameter value of the remineralized water, wherein the parameter is selected from the group comprising alkalinity, conductivity, total hardness, calcium concentration, pH, $CO_2$ concentration, total dissolved solids, and turbidity of the remineralized water, (d) comparing the measured parameter value with a predetermined parameter value, and (e) providing the amount of injected carbon dioxide and/or slurry on the basis of the difference between the measured and the predetermined parameter value. According to another embodiment the predetermined parameter value is a pH value, wherein the pH value is from 5.5 to 9, preferably from 7 to 8.5.

According to one embodiment the micronized calcium carbonate is used for remineralization of water, wherein the remineralized water is selected from drinking water, recreation water such as water for swimming pools, industrial water for process applications, irrigation water, or water for aquifer or well recharge.

The term "alkalinity (TAC)" as used in the present invention is a measure of the ability of a solution to neutralize acids to the equivalence point of carbonate or bicarbonate. The alkalinity is equal to the stoichiometric sum of the bases in solution and is specified in mg/l as $CaCO_3$. The alkalinity may be measured with a titrator.

For the purpose of the present invention the term "calcium concentration" refers to the total calcium content in the solution and is specified in mg/l as $Ca^{2+}$ or as $CaCO_3$. The concentration may be measured with a titrator.

"Conductivity" in the meaning of the present invention is used as an indicator of how salt-free, ion-free, or impurity-free the measured water is; the purer the water, the lower the conductivity. The conductivity can be measured with a conductivity meter and is specified in µS/cm.

"Ground calcium carbonate (GCC)" in the meaning of the present invention is a calcium carbonate obtained from natural sources including marble, chalk or limestone, and processed through a treatment such as grinding, screening and/or fractionizing by wet and/or dry, for example, by a cyclone. It is known to the skilled person that ground calcium carbonate can inherently contain a defined concentration of magnesium, such as it is the case for dolomitic calcite.

The term "Langelier Saturation Index (LSI)" as used in the present invention describes the tendency of an aqueous liquid to be scale-forming or corrosive, with a positive LSI indicating scale-forming tendencies and a negative LSI indicating a corrosive character. A balanced Langelier Saturation Index, i.e. LSI=0, therefore means that the aqueous liquid is in chemical balance. The LSI is calculated as follows:

$$LSI = pH - pH_s,$$

wherein pH is the actual pH value of the aqueous liquid and $pH_s$ is the pH value of the aqueous liquid at $CaCO_3$ saturation. The $pH_s$ can be estimated as follows:

$$pH_s = (9.3 + A + B) - (C + D),$$

wherein A is the numerical value indicator of total dissolved solids (TDS) present in the aqueous liquid, B is the numerical value indicator of temperature of the aqueous liquid in K, C is the numerical value indicator of the calcium concentration of the aqueous liquid in mg/l of $CaCO_3$, and D is the numerical value indicator of alkalinity of the aqueous liquid in mg/l of $CaCO_3$. The parameters A to D are determined using the following equations:

$$A=(\log_{10}(TDS)-1)/10,$$

$$B=-13.12\times\log_{10}(T+273)+34.55,$$

$$C=\log_{10}[Ca^{2+}]-0.4,$$

$$D=\log_{10}(TAC),$$

wherein TDS are the total dissolved solids in mg/l, T is the temperature in °C., $[Ca^2]$ is the calcium concentration of the aqueous liquid in mg/l of $CaCO_3$, and TAC is the alkalinity of the aqueous liquid in mg/l of $CaCO_3$.

The term "Silt Density Index (SDI)" as used in the present invention refers to the quantity of particulate matter in water and correlates with the fouling tendency of reverse osmosis or nanofiltration systems. The SDI can be calculated, e.g., from the rate of plugging of a 0.45 μm membrane filter when water is passed through at a constant applied water pressure of 208.6 kPa. The $SDI_{15}$ value is calculated from the rate of plugging of a 0.45 μm membrane filter when water is passed through at a constant applied water pressure of 208.6 kPa during 15 min. Typically, spiral wound reverse osmosis systems will need an SDI less than 5, and hollow fiber reverse osmosis systems will need an SDI less than 3.

The term "Modified Fouling Index (MFI)" as used in the present invention refers to the concentration of suspended matter and is a more accurate index than the SDI for predicting the tendency of a water to foul reverse osmosis or nanofiltration membranes. The method that can be used for determining the MFI may be the same as for the SDI except that the volume is recorded every 30 seconds over a 15 minute filtration period. The MFI can be obtained graphically as the slope of the straight part of the curve when t/V is plotted against V (t is the time in seconds to collect a volume of V in liters). A MFI value of <1 corresponds to a SDI value of about <3 and can be considered as sufficiently low to control colloidal and particulate fouling.

In case an ultrafiltration (UF) membrane is used for MFI measurements, the index is called MFI-UF in contrast to the $MFI_{0.45}$ where a 0.45 μm membrane filter is used.

For the purpose of the present invention, the term "micronized" refers to a particle size in the micrometer range, e.g., a particle size from 0.1 to 100 μm. The micronized particles may be obtained by techniques based on friction, e.g., milling or grinding either under wet or dry conditions. However, it is also possible to produce the micronized particles by any other suitable method, e.g., by precipitation, rapid expansion of supercritical solutions, spray drying, classification or fractionation of natural occurring sands or muds, filtration of water, sol-gel processes, spray reaction synthesis, flame synthesis, or liquid foam synthesis.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value for particles having a $d_{50}$ greater than 0.5 μm, a Sedigraph 5100 device from the company Micromeritics, USA can be used.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution.

The term "remineralization" as used in the present invention refers to the restoration of minerals in water not containing minerals at all or in a sufficient amount to obtain a water that is palatable. A remineralization can be achieved by adding at least calcium carbonate to the water to be treated. Optionally, e.g., for health-related benefits or to ensure the appropriate intake of some essential minerals and trace elements, further substances may be mixed to the calcium carbonate and then added to the water during the remineralization process. According to the national guidelines on human health and drinking water quality, the remineralized product may comprise additional minerals containing magnesium, potassium or sodium, e.g., magnesium carbonate, magnesium sulfate, potassium hydrogen carbonate, sodium hydrogen carbonate or other minerals containing essential trace elements.

For the purpose of the present invention, a "slurry" comprises insoluble solids and water and optionally further additives and usually contains large amounts of solids and, thus, is more viscous and generally of higher density than the liquid from which it is formed.

The term "total dissolved solids (TDS)" as used in the present invention is a measure of the combined content of all inorganic and organic substances contained in a liquid in molecular, ionized or micro-granular (colloidal sol) suspended form. Generally the operational definition is that the solids must be small enough to survive filtration through a sieve the size of two micrometer. The total dissolved solids can be estimated with a conductivity meter and are specified in mg/l.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

The inventive process for remineralization of water comprises the steps of (a) providing feed water, and (b) injecting gaseous carbon dioxide and a slurry into the feed water, wherein the slurry comprises micronized calcium carbonate.

The feed water to be is used in the inventive process can be derived from various sources. The feed water preferably treated by the process of the present invention is desalinated seawater, brackish water or brine, treated wastewater or natural water such as ground water, surface water or rainfall.

According to one embodiment of the present invention, the feed water can be pretreated. A pretreatment may be necessary, e.g., in case the feed water is derived from surface water, groundwater or rainwater. For example, to achieve the drinking water guidelines the water need to be treated through the use of chemical or physical techniques in order to remove pollutants such as organics and undesirable minerals. For example, ozonation can be used as a first pretreatment step, followed then by coagulation, flocculation, or decantation as a second treatment step. For example, iron (III) salts such as $FeClSO_4$ or $FeCl_3$, or aluminum salts such as $AlCl_3$, $Al_2(SO_4)_3$ or polyaluminium may used as flocculation agents. The flocculated materials can be removed from the feed water, e.g, by means of sand filters or multi-layered filters. Further water purification processes that may be used to pretreat the feed water are described, e.g., in EP 1 975 310, EP 1 982 759, EP 1 974 807, or EP 1 974 806.

According to another exemplary embodiment of the present invention, sea water or brackish water is firstly pumped out of the sea by open ocean intakes or subsurface intakes such as wells, and then it undergoes physical pretreatments such as screens, sedimendation or sand removal process. Depending on the required water quality, additional treatment steps such as coagulation and flocculation may be necessary in order to reduce potential fouling on the membranes. The pretreated seawater or brackish water may then be distilled, e.g., using multiple stage flash, multiple effect distillation, or membrane filtration such as ultrafiltration or reverse osmosis, to remove the remaining particulates and dissolved substances.

According to step (b) of the inventive process, gaseous carbon dioxide and a slurry comprising micronized calcium carbonate are injected into the feed water. According to one embodiment the carbon dioxide is injected in a first step, and the slurry is injected subsequently in a second step. According to an alternative embodiment, the slurry is injected in a first step, and the carbon dioxide is injected in a second step. However, it is also possible to inject the carbon dioxide and the slurry simultaneously. Preferably, the carbon dioxide is injected in a first step, and the slurry is injected subsequently in a second step. Without being bound to any theory, it is believed that injecting the carbon dioxide first will speed up the reaction.

The gaseous carbon dioxide may be obtained from a storage tank, in which it is held in the liquid phase. Depending on the consumption rate of carbon dioxide and the environment either cryogenic or conventionally insulated tanks may be used. The conversion of the liquid carbon dioxide into the gaseous carbon dioxide can be done using an air heated vaporizer, or an electrical or steam based vaporizing system. If necessary, the pressure of the gaseous carbon dioxide can be reduced prior to the injection step, e.g., by using a pressure reducing valve.

The gaseous carbon dioxide can be injected into a stream of feed water at a controlled rate, forming an dispersion of carbon dioxide bubbles in the stream and allowing the bubbles to dissolve therein. For example, the dissolution of carbon dioxide in the feed water can be facilitated by providing the feed water stream at a flow rate of 40-60 mg/l according to the starting $CO_2$ concentration in the permeate/distillate, the final target pH value (excess $CO_2$) and final target calcium concentration (added $CaCO_3$). According to an exemplary embodiment, the carbon dioxide is introduced into the stream of feed water at a turbulent region thereof, wherein the turbulence can be created, e.g., by a restriction in the pipeline. For example, the carbon dioxide may be introduced into the throat of a venturi disposed in the pipeline. The narrowing of the cross sectional area of the pipeline at the throat of the venturi creates turbulent flow of sufficient energy to break up the carbon dioxide into relatively small bubbles and thereby facilitate its dissolution. According to one embodiment, the carbon dioxide is introduced under pressure into the stream of water. According to another embodiment of the present invention, the dissolution of carbon dioxide in the feed water is facilitated by a static mixer.

A flow control valve or other means may be used to control the rate of flow of carbon dioxide into the stream. For example, a $CO_2$ dosing block and a $CO_2$ in-line measuring device may be used to control the rate of the $CO_2$ flow. According to one exemplary embodiment of the invention, the $CO_2$ is injected using a combined unit comprising a $CO_2$ dosing unit, a static mixer and an in-line $CO_2$ measuring device.

The carbon dioxide acidifies the feed water by forming carbonic acid. The amount of carbon dioxide that is injected into the feed water will depend on the amount of carbon dioxide that is already present in the feed water. The amount of carbon dioxide that is already present in feed water, in turn, will depend, e.g., on the treatment up-stream of the feed water. Feed water, for example, that has been desalinated by flash evaporation will contain another amount of carbon dioxide, and thus another pH, than feed water that has been desalinated by reverse osmosis. Feed water, for example, that has been desalinated by reverse osmosis may have a pH of about 5.3 and can have a low concentration of $CO_2$, e.g. of 2-5 mg/l.

The remineralization of the feed water is induced by injecting the slurry comprising the micronized calcium carbonate into the feed water.

The slurry that is injected into the feed water comprises micronized calcium carbonate. According to one embodiment the concentration of calcium carbonate in the slurry is from 0.05 to 40 wt.-%, from 1 to 25 wt.-%, from 2 to 20 wt.-%, from 3 to 15 wt.-%, or from 5 to 10 wt.-% based on the total weight of the slurry. According to another embodiment the concentration of calcium carbonate in the slurry is from 10 to 40 wt.-%, from 15 to 30 wt.-%, or from 20 to 25 wt.-% based on the total weight of the slurry.

The micronized calcium carbonate possesses a particle size in the micrometer range. According to one embodiment, the micronized calcium has a particle size from 0.1 to 100 μm, from 0.5 to 50 μm, from 1 to 15 μm, 2 to 10 μm or from 3 to 5 μm.

Examples for suitable calcium carbonates are ground calcium carbonate, modified calcium carbonate or precipitated calcium carbonate, or a mixture thereof. A natural ground calcium carbonate (GCC) may feature, e.g., one or more of marble, limestone, chalk, and/or dolomite. A precipitated calcium carbonate (PCC) may feature, e.g., one or more of aragonitic, vateritic and/or calcitic mineralogical crystal forms. Aragonite is commonly in the acicular form, whereas vaterite belongs to the hexagonal crystal system. Calcite can form scalenohedral, prismatic, spheral, and rhombohedral forms. A modified calcium carbonate may feature a natural ground or precipitated calcium carbonate with a surface and/or internal structure modification, e.g., the calcium carbonate may be treated or coated with a hydrophobising surface treatment agent such as, e.g. an aliphatic carboxylic acid or a siloxane. Calcium carbonate may be treated or coated to become cationic or anionic with, for example, a polyacrylate or polydadmac.

According to one embodiment of the present invention, the micronized calcium carbonate is a ground calcium carbonate (GCC). According to a preferred embodiment, the micronized calcium carbonate is a ground calcium carbonate having a particle size from 3 to 5 μm.

According to another embodiment of the present invention, the micronized calcium carbonate comprises a HCl insoluble content from 0.02 to 2.5 wt.-%, 0.05 to 1.5 wt.-%, or 0.1 to 0.6 wt.-% based on the total weight of the micronized calcium carbonate. Preferably, the HCl insoluble content of the micronized calcium carbonate does not exceed 0.6 wt.-% based on the total weight of the micronized calcium carbonate. The HCl insoluble content may be, e.g., minerals such as quartz, silicate or mica.

In addition to the micronized calcium carbonate, the slurry can comprise further micronized minerals. According to one embodiment, the slurry can comprise micronized magnesium carbonate, calcium magnesium carbonate, e.g. dolomitic limestone, calcareous dolomite, dolomite or half-burnt dolomite; magnesium oxide such as burnt dolomite, magnesium sulfate, potassium hydrogen carbonate, sodium hydrogen carbonate or other minerals containing essential trace elements.

According to one embodiment of the present invention, the slurry is freshly prepared by mixing water and the micronized calcium carbonate. The on-site preparation of the slurry may be preferred since premixed slurries may require the addition of further agents such as stabilizers or biocides, which may be unwanted compounds in the remineralized water. According to one preferred embodiment of the present invention, the time period between the preparation of the slurry and the injection of the slurry is short enough to avoid bacterial growth in the slurry. According to one exemplary embodiment, the time period between the preparation of the slurry and the injection of the slurry is less than 48 hours, less than 24 hours, less than 12 hours, less than 5 hours, less than 2 hours or less than 1 hour. According to another embodiment of the present invention, the injected slurry meets the microbiological quality requirements specified by the national guidelines for drinking water.

The slurry can be prepared, for example, using a mixer such as a mechanical stirrer for dilute slurries, or a specific powder-liquid mixing device for more concentrate slurries. Depending on the concentration of the prepared slurry the mixing time may be from 0.5 to 30 min, from 1 to 20 min, from 2 to 10 min, or from 3 to 5 min. According to one embodiment of the present invention, the slurry is prepared using a mixing machine, wherein the mixing machine enables simultaneous mixing and dosing of the slurry.

The water used to prepare the slurry can be, e.g., distilled water, feed water or industrial water. According to one preferred embodiment of the present invention, the water used to prepare the slurry is feed water, e.g. permeate or distillate obtained from a desalination process. According to one exemplary embodiment, the water used to prepare the slurry is acidified with carbon dioxide. Without being bound to any theory, it is believed that such an $CO_2$-pretreatment of the water used to prepare the slurry increases the dissolution of calcium carbonate in the water, and thus decreases the reaction time.

According to one embodiment the slurry comprising micronized calcium carbonate is injected directly into a stream of feed water. For example, the slurry can be injected into the feed water stream at a controlled rate by means of a pump communicating with a storage vessel for the slurry. Preferably, the slurry may be injected into the feed water stream at a rate of 1 to 10 liter per cubic meter of feed water depending on the slurry concentration. According to another embodiment the slurry comprising micronized calcium carbonate is mixed with the feed water in a reaction chamber, e.g., using a mixer such as a mechanical stirrer. According to still another embodiment the slurry is injected in a tank receiving the entire flow of feed water.

According to one embodiment of the present invention, only a part of the feed water is remineralized by injecting the slurry, and subsequently, the remineralized water is blended with untreated feed water. Optionally, only a part of the feed water is remineralized to a high calcium carbonate concentration in comparison with the final target values, and subsequently, the remineralized water is blended with untreated feed water.

According to another embodiment the treated water or part of the treated water is filtered, e.g., by ultra filtration, to further reduce the turbidity level of the remineralized water.

According to one embodiment of the present invention, the slurry is injected in such an amount that complete dissolution of the calcium carbonate is achieved. For example, the injection of $CO_2$ and slurry comprising calcium carbonate is tuned in such a way, that for one equivalent of $CO_2$ one equivalent of calcium carbonate is added into the feed water, or $CO_2$ can be injected at a defined excess in order to arrive at a defined pH. According to one embodiment, the inventive process is carried out in such a way that remineralization and neutralization of the $CO_2$ acidified feed water is achieved simultaneously.

If necessary, excess carbon dioxide can be stripped from the remineralized water using a gas stripping system. The excess carbon dioxide can be recycled for use in the inventive process.

The amounts of carbon dioxide and calcium carbonate injected into the feed water are selected so as to give a water of desired quality. For example the quality of the remineralized water can be assessed by the Langelier Saturation Index (LSI). According to one embodiment, the remineralized water has a Langelier Saturation Index from −1 to 2, preferably from −0.5 to 0.5, most preferred from −0.2 to 0.2. According to another embodiment, the remineralized water has a Slit Density Index $SDI_{15}$ below 5, preferably below 4, and most preferred below 3. According to still another embodiment the remineralized water has a Membrane Fouling Index $MFI_{0.45}$ below 4, preferably below 2.5, most preferred below 2. The assessment can be done, e.g., by measuring the pH of the treated feed water continuously. Depending on the remineralization system, the pH of the treated pH can be measured, e.g., in a stream of treated water, in a reaction chamber, wherein the slurry and the feed water is mixed, or in a storage tank for the remineralized water. According to one embodiment of the present invention, the pH is measured 30 min, 20 min, 10 min, 5 min or 2 min after the remineralization step. The measurement of the pH value may be done at room temperature, i.e. at about 20° C.

According to one exemplary embodiment of the invention, the amount of the injected carbon dioxide and/or the slurry is controlled by detecting the pH value of the treated feed water. Alternatively or additionally, the amount of injected carbon dioxide and/or the slurry is controlled by detecting parameters such as alkalinity, conductivity, total hardness, calcium concentration, $CO_2$ concentration, pH, total dissolved solids, or turbidity. According to one embodiment, the process of the present invention further comprises the steps of (c) measuring a parameter value of the remineralized water, wherein the parameter is selected from the group comprising alkalinity, conductivity, total hardness, calcium concentration, $CO_2$ concentration, pH, total dissolved solids, or turbidity of the remineralized water, (d) comparing the measured parameter value with a predetermined parameter value, and (e) providing the amount of injected carbon dioxide and/or slurry on the basis of the difference between the measured and the predetermined parameter value.

According to one embodiment, the predetermined parameter value is a pH value, wherein the pH value is from 5.5 to 9, preferably from 7 to 8.5.

Figure 1:
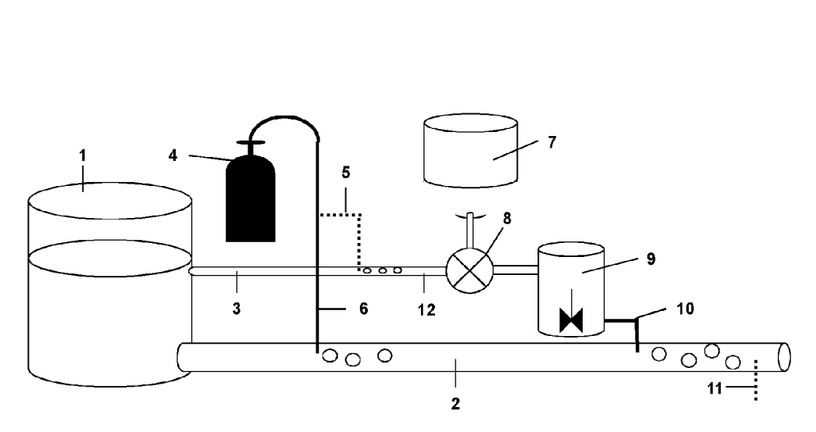

FIG. 1 shows a scheme of an apparatus that can be used for operating the inventive method. Feed water flows from a reservoir (1) into a pipeline (2). The pipeline (2) has a gas inlet (6) through which carbon dioxide from a carbon dioxide source (4) can be injected into the feed water. A second inlet (10) is located downstream of the gas inlet (6) through which the slurry comprising micronized calcium carbonate is injected into the feed water stream from a storage tank (9) for the slurry. The slurry is prepared on-site using a suitable mixer (8) by mixing water that is obtained from the reservoir (1) via a pipe (12) and micronized calcium carbonate obtained from a storage container (7). Optionally, carbon dioxide can be injected into the water for preparing the slurry via a gas inlet (5). The pH of the remineralized water can be measured downstream of the slurry inlet (10) on a sample point (11). According to one embodiment the flow rate of the feed water is 20000 and 500000 m$^3$ per day.

The inventive process may be used to produce drinking water, recreation water such as water for swimming pools, industrial water for process applications, irrigation water, or water for aquifer or well recharge.

According to one embodiment, the carbon dioxide and calcium carbonate concentrations in the remineralized water meet the required values for drinking water quality, which are set by national guidelines. According to one embodiment the remineralized water obtained by the inventive process has a calcium concentration from 15 to 200 mg/l as $CaCO_3$, preferably from 50 to 150 mg/l as $CaCO_3$, and most preferred from 100 to 125 mg/l as $CaCO_3$, or from 15 to 100 mg/l, preferably from 20 to 80 mg/l, and most preferably from 40 to 60 mg/l. In case the slurry comprises a further magnesium salt such as magnesium carbonate, or magnesium sulfate, the remineralized water obtained by the inventive process may have a magnesium concentration from 5 to 25 mg/l, preferably from 5 to 15 mg/l, and most preferred from 8 to 12 mg/l.

According to one embodiment of the present invention the remineralized water has a turbidity of lower than 5.0 NTU, lower than 1.0 NTU, lower than 0.5 NTU, or lower than 0.3 NTU.

According to one exemplary embodiment of the present invention the remineralized water has a LSI from −0.2 to +0.2, a calcium concentration from 15 to 200 mg/l, a magnesium concentration from 5 to 25 mg/l, an alkalinity between 100 and 200 mg/l as CaCO3, a pH between 7 and 8.5, and a turbidity of lower than 0.5 NTU.

According to one embodiment of the present invention a step of particle removal is carried out after mineralization, e.g., to reduce the turbidity level of the remineralized water. It is also possible to carry out a particle removal step before the injection of the carbon dioxide and/or the slurry, e.g., to reduce the turbidity level of the feed water or part of the feed water. According to one embodiment a sedimentation step is carried out. For example, the feed water and/or remineralized water may be piped into a clarifier or storage tank to further reduce the turbidity level of the water. According to another embodiment the particles may be removed by decantation. Alternatively, at least a part of the feed water and/or remineralized water may be filtered, e.g., by ultra filtration, to further reduce the turbidity level of the water.

EXAMPLES

The following examples show different slurries with various concentrations of calcium carbonate which were prepared from different carbonate rocks.

The feed water was obtained from a reverse osmosis desalination process and was acidified with about 50 mg/l $CO_2$. The slurries were prepared by mixing an appropriate amount of calcium carbonate with 100 ml feed water at room temperature using a magnetic stirrer, with stirring between 1000 and 1500 rpm and a mixing time between 3 and 5 min. The remineralization was performed by adding the slurry in small amounts to about one liter of the acidified feed water, wherein the slurry and the feed water were mixed using a magnetic stirrer, with stirring between 1000 and 1500 rpm and a mixing time of 2 min. After every slurry addition, a sample was taken from the treated feed water to control the alkalinity, turbidity, conductivity, pH, temperature. A final calcium concentration of 125 mg/l as $CaCO_3$ was chosen as target for remineralization of the feed water. For each sample the turbidity of the remineralized water was measured directly after mixing and after a settling period of minimum 60 min. The turbidity measured on the settled samples was performed in order to observe the impact of sedimentation in the remineralization process.

The turbidity was measured with a Hach Lange 2100AN IS Laboratory Turbidimeter and the calibration was performed using StabCal turbidity standards (formazin standards) of <0.1, 20, 200, 1000, 4000 and 7500 NTU.

The total alkalinity was measured with a Mettler-Toledo T70 Titrator using the related LabX Light Titration software. A DGi111-SG pH electrode was used for this titration according to the corresponding Mettler-Toledo method M415 of the application brochure 37 (water analysis). The calibration of the pH electrode was performed using Mettler-Toledo standards of pH values 4.01, 7.00 and 9.21.

Example 1—Slurry A

Two slurries having a calcium carbonate concentration of 0.5 and 5 wt.-% based on the total weight of the slurry were prepared from marble micronized calcium carbonate having a particle size of 3.5 μm and a HCl insoluble content of 0.2 wt.-% based on the total weight of the calcium carbonate.

The results compiled in Table 1 show similar turbidity values for both remineralization processes with 0.5 wt.-% and 5 wt.-% $CaCO_3$ slurries. After a settling period, the samples presented turbidity values lower than 0.5 NTU.

Example 2—Slurry B

Three slurries having a calcium carbonate concentration of 0.5, 1 and 10 wt.-% based on the total weight of the slurry were prepared from marble micronized calcium carbonate having a particle size of 2.8 μm and a HCl insoluble content of 1.5 wt.-% based on the total weight of the calcium carbonate.

The results compiled in Table 1 show similar turbidity values for all three remineralization processes. However the turbidity values measured for the settled samples taken after two minutes of remineralization are higher than those of example 1, which may be due to the difference in the HCl insoluble content of the marble calcium carbonate.

Example 3—Slurry C

A slurry having a calcium carbonate concentration of 5 wt.-% based on the total weight of the slurry was prepared from limestone micronized calcium carbonate having a particle size of 3 μm and a HCl insoluble content of 0.1 wt.-% based on the total weight of the calcium carbonate.

The results compiled in Table 1 show that the turbidity value measured for the settled sample is much lower in comparison to the values of example 1 and 2, which may be due to the different geological structures of the carbonate rocks.

TABLE 1

| Slurry | Slurry concentration (wt.-%) | Turbidity (NTU) Fresh sample | Turbidity (NTU) Settled sample | Alkalinity fresh sample (mg/l CaCO$_3$) |
|---|---|---|---|---|
| A | 0.5 | 35 | 0.44 | 100 |
| A | 5.0 | 32 | 0.45 | 120 |
| B | 0.5 | 26 | 3.90 | 115 |
| B | 1.0 | 25 | 3.50 | 112 |
| B | 10.0 | 24 | 3.30 | 119 |
| C | 5.0 | 20 | 0.21 | 117 |

Example 4—Different Particle Sizes

Three slurries having a calcium carbonate concentration of 5 wt.-% based on the total weight of the slurry were prepared from marble micronized calcium carbonate having a particle size of 3.5, 9, and 20 µm, respectively, and a HCl insoluble content of 0.2 wt.-% based on the total weight of the calcium carbonate.

The results compiled in Table 2 show that after a settling period the turbidity of the water remineralized with a larger particle size, i.e. 20 µm, has a lower turbidity value in comparison with the turbidity of the water remineralized with smaller particle size, i.e. 3.5 µm.

TABLE 2

| Mean particle size (µm) | Turbidity (NTU) Fresh sample | Turbidity (NTU) Settled sample | Alkalinity fresh sample (mg/l CaCO$_3$) |
|---|---|---|---|
| 3.5 | 32 | 0.45 | 120 |
| 9 | 22 | 0.36 | 78 |
| 20 | 27 | 0.31 | 67 |

Pilot-Scale Examples

The following pilot-scale examples show different remineralization trials using aqueous slurries of calcium carbonate. The micronized calcium carbonate used to prepare all slurries for these pilot tests is a limestone having a particle size of 3 µm and a HCl insoluble content of 0.1 wt.-% based on the total weight of the calcium carbonate. It corresponds to the calcium carbonate used to prepare the slurry C presented in example 3. The solid content of the aqueous slurries of micronized calcium carbonate was between 0.4 and 20 wt %, based on the weight of the micronized calcium carbonate. The aqueous medium used in order to prepare the micronized calcium carbonate slurries was water that was obtained by reverse osmosis. In the following the terms "water obtained by reverse osmosis" and "reverse osmosis or RO water" will be used synonymously.

In the pilot-scale tests either 50 or 100 mg/L of CaCO$_3$ was added to water that was obtained by reverse osmosis (RO).

All pilot-scale tests were performed in a Flashmix FM30 mixer from Silverson at normal pressure and by using an excess amount of CO$_2$. The remineralization tests were run either in a batch mode or a continuous mode, both using a buffer tank of 400 L. The micronized calcium carbonate slurries were added by the means of a feed valve for the batch mode and by the means of a peristaltic pump for the in-line remineralization trials.

The dissolution of the calcium carbonate dosed into the CO$_2$-acidified water was studied by measuring pH, conductivity and turbidity. According to the decrease of turbidity and the increase of conductivity, it was possible to evaluate the reaction time for the complete dissolution of CaCO$_3$ under specific conditions, e.g. the initial RO water quality, temperature, CO$_2$ excess, in order to meet the target water quality, e.g. a turbidity of <1 NTU.

1. Batch Tests for a Remineralization of RO Water by the Addition of 100 m/L of CaCO$_3$ and Different CO$_2$ Flow Rates Remineralization tests using micronized CaCO$_3$ slurries were initially performed in a batch mode in order to study the dissolution of CaCO$_3$ in function of the CO$_2$ dosing. This was performed by pumping the 400 L of water obtained by reverse osmosis and contained in the buffer tank through the mixer in a closed loop. For these batch tests the CO$_2$ dosing took place before the pump and the Flashmix mixer, at a CO$_2$ pressure of 4.5 bars and for a defined period of time.

The micronized calcium carbonate slurry used had a solids content of 20 wt %, based on the weight of the micronized calcium carbonate. For the remineralization 100 mg/L of CaCO$_3$ was added to the RO water at once through the feed valve.

The RO water used for these tests had the following parameters:

| | pH | Temperature (° C.) | Conductivity (µS/cm) |
|---|---|---|---|
| RO water | 5.4-5.5 | 25 | 14-18 |

The conductivity, pH and turbidity were measured for each test and an exponential behaviour was observed for a turbidity decrease and a conductivity increase. The required reaction time to achieve the target turbidity could therefore be estimated for each CO$_2$ dosing.

Table 3 shows the different results obtained for the remineralization of RO water by the addition of 100 mg/L of CaCO$_3$ using a micronized calcium carbonate slurry having a solids content of 20 wt %, based on the weight of micronized calcium carbonate, and using different CO$_2$ flow rates.

TABLE 3

| Trials No. | CO$_2$ flow rate (mL/min) | Estimated time required to achieve the required turbidity (min) <2 NTU | <1 NTU | <0.5 NTU |
|---|---|---|---|---|
| 1 | 2 | 79 | 93 | 106 |
| 2 | 4 | 52 | 61 | 70 |
| 3 | 8 | 32 | 38 | 43 |

As can be taken form Table 3, and as expected, the dissolution of CaCO$_3$ can be speeded up by using an excess of CO$_2$ dosed during the trials. A turbidity of <1 NTU could be achieved after approximately 90 min, 60 min and 40 min for a CO$_2$ flow rate of 2, 4 and 8 L/min, respectively.

2. Batch Tests for a Remineralization of RO Water by the Addition of 50 mg/L of $CaCO_3$ and Different $CO_2$ Dosing Times All tests were performed using the same protocol as the previous described pilot-scale tests; however the added calcium concentration in the treated RO water was 50 mg/L instead of 100 mg/L.

For these batch tests, the position where the $CO_2$ was introduced into the system was the same as during the former tests, e.g. before the pump and the Flashmix mixer. The $CO_2$ dosing was performed at 4.5 bars and with a constant flow of 4 L/h for different dosing times. All tests were conducted using an excess amount of $CO_2$ with respect to the amount of $CaCO_3$ added to the RO water. The impact of the $CO_2$ dosing time, i.e. the excess of $CO_2$ dosed during these batch tests, on the turbidity of the remineralized water was observed.

Table 4 shows the different results obtained for the remineralization of RO water by the addition of 50 mg/L of $CaCO_3$ using a micronized calcium carbonate slurry having a solids content of 10 wt %, based on the weight of micronized calcium carbonate, and using a constant $CO_2$ flow rate of 4 L/h for different dosing times.

TABLE 4

| Trials No. | $CO_2$ dosing time (min) | Estimated time required to achieve the required turbidity (min) | |
|---|---|---|---|
| | | <2 NTU | <1 NTU |
| 4 | continuous $CO_2$ dosing | 28 | 39 |
| 5 | 10 min $CO_2$ dosing | 55 | 87 |
| 6 | 20 min $CO_2$ dosing | 33 | 56 |
| 7 | 10 min $CO_2$ pre-dosing (total $CO_2$ dosing = 20 min) | 44 | — |

In trial 4 the $CO_2$ was continuously dosed to the RO water, while in trails 5 and 6 the $CO_2$ was dosed only for the first 10 or 20 minutes of the trial. In trial 7, the RO water was first treated for 10 minutes with the $CO_2$ without the addition of any $CaCO_3$. Then, the micronized calcium slurry was added and further $CO_2$ was dosed for additional 10 minutes of the trial.

It was observed for trial 7 that the $CO_2$ pre-dosing presented a faster turbidity decrease at the start of the experiment when compared to the other trials 4 to 6, when no pre-dosing was carried out. However, no further improvements were observed when the $CO_2$ dosing was stopped. In addition the time required to reach the target level of turbidity was proportional to the $CO_2$ dosing time for all trials. The fastest trial was trial 4, where the $CO_2$ was continuously added. The slowest trial was trial 5, where the $CO_2$ was dosed for 10 minutes, only. A turbidity of <1 NTU could be achieved after in approximately 90 min, 60 min and 40 min for a 10 min, 20 min and continuous $CO_2$ dosing time, respectively.

3. Continuous Remineralization Tests for a Remineralization of RO Water by the Addition of 50 m/L of $CaCO_3$ and with Different $CO_2$ Flow Rates Using the same set-up described above with regard to the batch tests, two remineralization trials were performed in a continuous mode.

In order to initiate the trials in continuous mode, first of all one batch of 400 L of RO water was initially treated with 50 mg/L of $CaCO_3$ by using a micronized calcium carbonate slurry having a solids content of 10 wt %, based on the weight of micronized calcium carbonate. When the turbidity reached a value of <1 NTU the continuous remineralization process was started by adding an aqueous micronized calcium carbonate slurry having a solid content of 0.4 wt %, based on the weight of the micronized calcium carbonate, at 0.15 L/min by the means of a peristaltic pump. The remineralized water was produced at a rate of 12 L/min.

It has to be stressed that th continuous remineralization trials presented very stable conditions regarding pH, conductivity and turbidity over a period greater than an hour.

Table 5 shows the results for the continuous remineralization of RO water by the addition of 50 mg/L of $CaCO_3$ using a micronized calcium carbonate slurry having a solids content of 0.4 wt %, based on the weight of the micronized calcium carbonate, and using different $CO_2$ flow rates.

TABLE 5

| | | Final water quality of the treated water | | |
|---|---|---|---|---|
| Trials No. | $CO_2$ flow rate (mL/min) | pH | Conductivity (µS/cm) | Turbidity (NTU) |
| 8 | 2 | 5.5 | 65 | 12 |
| 9 | 4 | 5.2 | 55 | 4 |

The invention claimed is:

1. A process for remineralization of water comprising the steps of:
   a) providing feed water in need of remineralization,
   b) preparing a slurry comprising 0.05 to 40 wt.-% of micronized calcium carbonate based on the total weight of the slurry by mixing water and micronized calcium carbonate, wherein the micronized calcium carbonate has a particle size of 0.5 µm to 100 µm, the micronized calcium carbonate has a HCl insoluble content from 0.05 to 1.5 wt.-% based on the total weight of the micronized calcium carbonate, and the micronized calcium carbonate is ground calcium carbonate obtained from limestone, marble and/or chalk, calcium carbonate treated with a surface treatment agent, precipitated calcium carbonate, or any mixture thereof, and
   c) injecting gaseous carbon dioxide and the slurry comprising micronized calcium carbonate into the feed water at controlled flow rates until the feed water has one or more of a desired alkalinity, conductivity, calcium concentration, pH, total dissolved solids and turbidity, and remineralized water is obtained.

2. The process of claim 1, wherein the concentration of calcium carbonate in the slurry is from 1 to 25 wt.-%, based on the total weight of the slurry.

3. The process of claim 1, wherein the concentration of calcium carbonate in the slurry is from 2 to 20 wt.-%, based on the total weight of the slurry.

4. The process of claim 1, wherein the concentration of calcium carbonate in the slurry is from 3 to 15 wt.-%, based on the total weight of the slurry.

5. The process of claim 1, wherein the calcium carbonate has a particle size from 0.5 to 50 nm.

6. The process of claim 1, wherein the calcium carbonate has a particle size from 1 to 15 nm.

7. The process of claim 1, wherein the calcium carbonate has a particle size from 2 to 10 nm.

8. The process of claim 1, wherein the calcium carbonate has a particle size from 3 to 5 nm.

9. The process of claim 1, wherein the micronized calcium carbonate has a HCl insoluble content from 0.1 to 0.6 wt.-%, based on the total weight of the micronized calcium carbonate.

10. The process of claim 1, wherein the micronized calcium carbonate is a ground calcium carbonate obtained from limestone, marble and/or chalk.

11. The process of claim 1, wherein the slurry further comprises magnesium, potassium, sodium, magnesium carbonate, calcium magnesium carbonate, dolomitic limestone, calcareous dolomite, dolomite, half-burnt dolomite, magnesium oxide, burnt dolomite, magnesium sulfate, potassium hydrogen carbonate, or sodium hydrogen carbonate.

12. The process of claim 1, wherein the slurry is freshly prepared by mixing water and the calcium carbonate.

13. The process of claim 12, wherein the time period between the preparation of the slurry and the injection of the slurry is less than 24 hours.

14. The process of claim 12, wherein the time period between the preparation of the slurry and the injection of the slurry is less than 2 hours.

15. The process of claim 1, wherein the obtained remineralized water has a calcium concentration as calcium carbonate from 15 to 200 mg/l.

16. The process of claim 1, wherein the obtained remineralized water has a calcium concentration as calcium carbonate from 50 to 150 mg/l.

17. The process of claim 1, wherein the obtained remineralized water has a calcium concentration as calcium carbonate from 100 to 125 mg/l.

18. The process of claim 1, wherein the obtained remineralized water has a calcium concentration as calcium carbonate from 15 to 100 mg/l.

19. The process of claim 1, wherein the obtained remineralized water has a calcium concentration as calcium carbonate from 20 to 80 mg/l.

20. The process of claim 1, wherein the obtained remineralized water has a calcium concentration as calcium carbonate from 40 to 60 mg/l.

21. The process of claim 1, wherein the slurry comprises further minerals containing magnesium and the obtained remineralized water has a magnesium concentration from 5 to 25 mg/l.

22. The process of claim 1, wherein the remineralized water has a turbidity value of lower than 5.0 NTU.

23. The process of claim 1, wherein the remineralized water has a turbidity value of lower than 1.0 NTU.

24. The process of claim 1, wherein the remineralized water has a turbidity value of lower than 0.5 NTU.

25. The process of claim 1, wherein the remineralized water has a turbidity value of lower than 0.3 NTU.

26. The process of claim 1, wherein the remineralized water has one or more of a Langlier Saturation Index from −1 to 2, a Slit Density Index $SDI_{15}$ below 5, and a Membrane Fouling Index $MFI_{0.45}$ below 4.

27. The process of claim 1, wherein the remineralized water has one or more of a Langlier Saturation Index from −0.5 to 0.5, a Slit Density Index $SDI_{15}$ below 4, and a Membrane Fouling Index $MFI_{0.45}$ below 2.5.

28. The process of claim 1, wherein the remineralized water has one or more of a Langlier Saturation Index from −0.2 to 0.2, a Slit Density Index $SDI_{15}$ below 3, and a Membrane Fouling Index $MFI_{0.45}$ below 2.

29. The process of claim 1, wherein the feed water is desalinated seawater, brackish water, brine, treated wastewater, natural water, ground water, surface water or rainfall.

30. The process of claim 1, wherein the carbon dioxide is injected in a first step, and the slurry is injected subsequently in a second step, or wherein the slurry is injected in a first step and the carbon dioxide is injected subsequently in a second step, or wherein the carbon dioxide and the slurry are injected simultaneously.

31. The process of claim 1, wherein carbon dioxide is injected in the water used for the slurry preparation.

32. The process according to claim 1, wherein the remineralized water is blended with feed water.

33. The process according to claim 1, wherein the process further comprises a particle removal step.

34. The process of claim 1, wherein one or more of a alkalinity, conductivity, calcium concentration, pH, total dissolved solids and turbidity is measured and compared to a predetermined parameter value, and the amount of injected carbon dioxide and/or slurry is adjusted based on the difference between the measured and the predetermined parameter value.

35. The process of claim 34, wherein the predetermined parameter value is a pH value, wherein the pH value is from 5.5 to 9.

36. The process of claim 34, wherein the predetermined parameter value is a pH value, wherein the pH value is from 7 to 8.5.

* * * * *